United States Patent
Suh et al.

(10) Patent No.: US 9,900,578 B2
(45) Date of Patent: Feb. 20, 2018

(54) METHOD AND APPARATUS FOR PROCESSING BROADCAST SIGNALS FOR 3D BROADCAST SERVICE

(71) Applicant: LG ELECTRONICS INC., Seoul (KR)

(72) Inventors: Jongyeul Suh, Seoul (KR); Jeehyun Choe, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 359 days.

(21) Appl. No.: 14/405,351

(22) PCT Filed: Jun. 5, 2013

(86) PCT No.: PCT/KR2013/004983
§ 371 (c)(1),
(2) Date: Dec. 3, 2014

(87) PCT Pub. No.: WO2013/183947
PCT Pub. Date: Dec. 12, 2013

(65) Prior Publication Data
US 2015/0116455 A1    Apr. 30, 2015

Related U.S. Application Data

(60) Provisional application No. 61/655,491, filed on Jun. 5, 2012.

(51) Int. Cl.
*H04N 13/00* (2006.01)
(52) U.S. Cl.
CPC ..... *H04N 13/0062* (2013.01); *H04N 13/0011* (2013.01); *H04N 13/0066* (2013.01);
(Continued)

(58) Field of Classification Search
CPC .................................................. H04N 13/0062
(Continued)

(56) References Cited

U.S. PATENT DOCUMENTS 6,104,425 A    8/2000 Kanno
8,675,050 B2   3/2014 Sakaguchi et al.
(Continued)

FOREIGN PATENT DOCUMENTS

CN    101919259 A    12/2010
EP      0769881 A2     4/1997
(Continued)

*Primary Examiner* — Christopher S Kelley
*Assistant Examiner* — Jonathan Messmore
(74) *Attorney, Agent, or Firm* — Birch, Stewart, Kolasch & Birch, LLP

(57) ABSTRACT

An apparatus for processing 3-Dimensional (3D) broadcast signals, comprises: a tuner for receiving broadcast signals containing 3D content; a service information processor for parsing target viewing information and at least one reference viewing condition information received from the broadcast signals which are received; a viewing analysis module for receiving viewing condition information of the viewer, parsing compensation-type information that is included in the reference viewing condition information, which contains information that is most relevant to the viewing condition information that is received, and for rendering the 3D content so that an element expressed by the correction-type information is maintained; and an output formatter for controlling so that the 3D content that is rendered is displayed.

12 Claims, 19 Drawing Sheets

(52) U.S. Cl.
CPC ............... *H04N 2013/0081* (2013.01); *H04N 2213/005* (2013.01)

(58) Field of Classification Search
USPC ........................................................ 348/42
See application file for complete search history.

(56) References Cited

U.S. PATENT DOCUMENTS

| | | | |
|---|---|---|---|
| 2009/0245347 A1 | 10/2009 | Lee et al. | |
| 2010/0002069 A1* | 1/2010 | Eleftheriadis | H04N 7/152 348/14.08 |
| 2010/0007582 A1 | 1/2010 | Zalewski | |
| 2010/0309202 A1 | 12/2010 | Watanabe | |
| 2011/0032328 A1* | 2/2011 | Raveendran | H04N 13/0497 348/43 |
| 2011/0150421 A1 | 6/2011 | Sasaki et al. | |
| 2011/0273530 A1 | 11/2011 | Suh et al. | |
| 2012/0050471 A1 | 3/2012 | Kim et al. | |
| 2012/0092453 A1* | 4/2012 | Suh | H04N 13/0066 348/43 |
| 2012/0182397 A1* | 7/2012 | Heinzle | H04N 13/0239 348/47 |
| 2013/0093849 A1* | 4/2013 | He | H04N 13/0029 348/43 |

FOREIGN PATENT DOCUMENTS

| | | |
|---|---|---|
| EP | 2637412 A2 | 9/2013 |
| JP | 2010-45584 A | 2/2010 |
| JP | 2011-120301 A | 6/2011 |
| JP | 2011-146828 A | 7/2011 |
| JP | 2011-259289 A | 12/2011 |
| JP | 2012-10136 A | 1/2012 |
| KR | 10-0313178 B1 | 12/2001 |
| KR | 10-2009-0102116 A | 9/2009 |
| KR | 10-1028930 B1 | 4/2011 |
| KR | 10-2012-0023268 A | 3/2012 |
| WO | WO 2009/119955 A1 | 10/2009 |
| WO | WO 2010/087575 A2 | 8/2010 |
| WO | WO 2011/033423 A1 | 3/2011 |
| WO | WO 2012/060569 A2 | 5/2012 |

\* cited by examiner

| Screen size | Required number of pixels for displaying unlimited depth |
|---|---|
| 14-inch | 402.7 |
| 23-inch | 245.1 |
| 32-inch | 176.2 |
| 42-inch | 134.2 |
| 52-inch | 108.4 |

FIG. 10

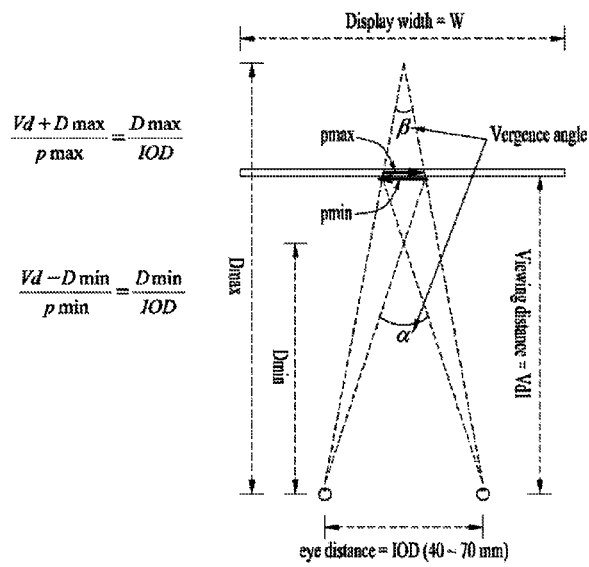

$$\frac{Vd + D\max}{p\max} = \frac{D\max}{IOD}$$

$$\frac{Vd - D\min}{p\min} = \frac{D\min}{IOD}$$

FIG. 11

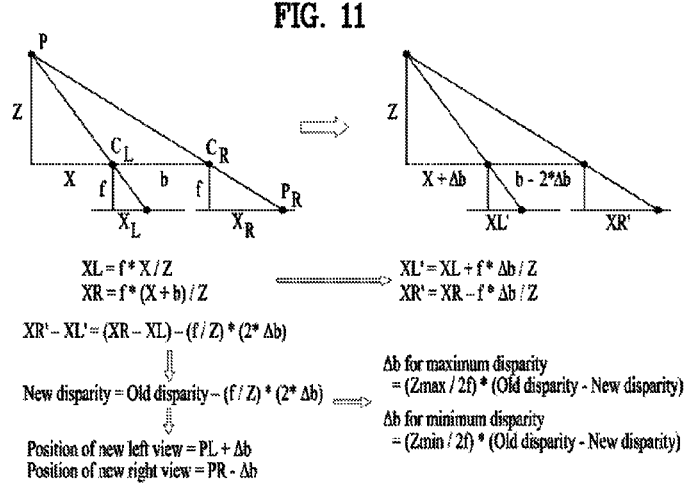

$XL = f * X / Z$
$XR = f * (X + b) / Z$ $XL' = XL + f * \Delta b / Z$
$XR' = XR - f * \Delta b / Z$ $XR' - XL' = (XR - XL) - (f / Z) * (2 * \Delta b)$ New disparity = Old disparity − (f / Z) * (2 * Δb)

Position of new left view = PL + Δb
Position of new right view = PR − Δb

Δb for maximum disparity
= (Zmax / 2f) * (Old disparity − New disparity)

Δb for minimum disparity
= (Zmin / 2f) * (Old disparity − New disparity)

FIG. 12

| Syntax | Format |
|---|---|
| Stereo_3D_rendering_info descriptor ( ) { | |
| descriptor_tag | u(8) |
| descriptor_length | u(8) |
| view_pair_ID | u(8) |
| target_parameter_valid_flag | u(4) |
| reserved | '1111' |
| target_display_size | u(8) |
| target_IOD | u(8) |
| target_viewing_distance | u(8) |
| rendered_param ( ) | |
| num_of_references | u(8) |
| for (j=0; j< num_of_references; j++) { | |
| ref_parameter_valid_flag | u(4) |
| compensation_type | u(4) |
| ref_display_size | u(8) |
| ref_IOD | u(8) |
| ref_viewing_distance | u(8) |
| ref_compensation_param ( ) | |
| } | |
| } | |

FIG. 13

| compensation_type | Maintaining factors |
|---|---|
| 0x00 | Vergence angle |
| 0x01 | Parallax angle |
| 0x02 | Distance range (based on viewer position) |
| 0x03 | Distance range (based on screen position) |
| 0x04 | Reserved |
| 0x05 | Reserved |
| 0x06 | Reserved |
| 0x07 | Reserved |

FIG. 14

| Syntax | Format |
|---|---|
| view_pair_descriptor ( ) { | |
| descriptor_tag | u(8) |
| descriptor_length | u(8) |
| num_of_view_pairs | u(8) |
| for (j=0; j< num_of_view_pairs; j++) { | |
| view_pair_ID | u(8) |
| left_PID | u(13) |
| right_PID | u(13) |
| reserved | '111111' |
| } | |
| } | |

FIG. 15

```
PMT
......
program_number = 0x0002
stereo_3D_rendering_info_descriptor (option 1)
view_pair_descriptor
......
    stream_type = 0x1B (AVC video, View 1)
    elementary_PID = 0x0090
    stereo_3D_rendering_info_descriptor (option 3)
......
    stream_type = 0x20 (MVC extension, View 2)
    elementary_PID = 0x00A0
    stereo_3D_rendering_info_descriptor (option 3)
......
    stream_type = 0x26 (depth stream, View 1)
    elementary_PID = 0x0091
    stereo_3D_rendering_info_descriptor (option 2)
......
    stream_type = 0x26 (depth stream, View 2)
    elementary_PID = 0x00A1
    stereo_3D_rendering_info_descriptor (option 2)
......
```

FIG. 16

```
TVCT

......
    major_channel_number
    minor_channel_number
......
    channel_TSID
    program_number
......
    service_type = 0x07 or 0x09 (3DTV service)
......
    stereo_3D_rendering_info_descriptor (Option 1)
    view_pair_descriptor
```

FIG. 17

| Syntax | Number of bits | Identifier |
|---|---|---|
| service_description_section () { | | |
|   table_id | 8 | uimsbf |
|   section_syntax_indicator | 1 | bslbf |
|   reserved_future_use | 1 | bslbf |
|   reserved | 2 | bslbf |
|   section_length | 12 | uimsbf |
|   transport_stream_id | 16 | uimsbf |
|   reserved | 2 | bslbf |
|   version_number | 5 | uimsbf |
|   current_next_indicator | 1 | bslbf |
|   section_number | 8 | uimsbf |
|   last_section_number | 8 | uimsbf |
|   original_network_id | 16 | uimsbf |
|   reserved_future_use | 8 | bslbf |
|   for (i=0; i< N; i++) { | | |
|     service_id | 16 | uimsbf |
|     reserved_future_use | 6 | bslbf |
|     EIT_schedule_flag | 1 | bslbf |
|     EIT_present_following_flag | 1 | bslbf |
|     running_status | 3 | uimsbf |
|     free_CA_mode | 1 | bslbf |
|     descriptors_loop_length | 12 | uimsbf |
|     for (j=0; j<N; j++) { | | |
|       descriptor() | | |
|     } | | |
|   } | | |
|   CRC_32 | 32 | rpchof |
| } | | |

---------- Position of Stereo 3D rendering info and view pair descriptor

FIG. 18

| Syntax | Number of bits | Format |
|---|---|---|
| user_data_registered_itu_t_t35() { | | |
|     itu_t_t35_country_code | 8 | bslbf |
|     itu_t_t35_provider_code | 16 | bslbf |
|     user_identifier | 32 | bslbf |
|     user_structure() | | |
| } | | |

FIG. 19

| user_identifier | user_structure() |
|---|---|
| 0x47413934 ('GA94') | DVB1_data() |
| 0x44544731 ('DTG1') | afd_data() |

(a)

| Syntax | Number of bits | Identifier |
|---|---|---|
| DVB1_data() { | | |
|     user_data_type_code | 8 | uimsbf |
|     user_data_type_structure() | | |
| } | | |

| Syntax | Format |
|---|---|
| Stereo_3D_rendering_info_data ( ) { | |
|   stereo_3D_rendering_info_id | u(v) |
|   stereo_3D_rendering_info_cancel_flag | u(1) |
|   if (stereo_3D_rendering_info_cancel_flag == '0') { | |
|     view_pair_id | u(8) |
|     target_parameter_valid_flag | u(4) |
|     reserved | '1111' |
|     target_display_size | u(8) |
|     target_IOD | u(8) |
|     target_viewing_distance | u(8) |
|     rendered_param () | |
|     num_of_references | u(8) |
|     for (j=0; j< num_of_references; j++) { | |
|       ref_parameter_valid_flag | u(4) |
|       compensation_type | u(4) |
|       ref_display_size | u(8) |
|       ref_IOD | u(8) |
|       ref_viewing_distance | u(8) |
|       ref_compensation_param () | |
|     } | |
|   } | |
| } | |

FIG. 21

| Syntax | Number of bits | Format |
|---|---|---|
| stereo_3D_rendering_info_SEI_descriptor ( ) { | | |
|   descriptor_tag | 8 | 0xTBD |
|   descriptor_length | 8 | uimsbf |
|   reserved | 6 | '111111' |
|   stereo_3D_rendering_info_SEI_message_exist_flag | 1 | bslbf |
| } | | |

FIG. 23

| Type of channel | In-band (3D channel / 2D channel) | Broadband / Other channel (additional view video elements) |
|---|---|---|
| Signaling method | - PMT program level<br>- TVCT channel level<br>- SDT service level<br>- EIT event level<br>- Video header in additional view video element (SEI message, etc.) | - In case of Broadband<br>  · IP layer signaling<br>  · video level signaling<br>- In case of other channel<br>  · PMT program level<br>  · TVCT channel level<br>  · SDT service level<br>  · EIT event level<br>  · Video header in additional view video element (SEI message, etc.) |
| Service configuration elements | - Base view + additional view video elements (3D channel)<br>- Base view video only (2D channel) | - Only additional view video element |
| Signaling content | - Target display condition respective to combination of Base view + additional view video elements<br>Parameter (viewing distance, display size, IOD, etc) – omitted in case of 2D channel<br>- Although video data are absent, condition information respective a virtual view point that can be rendered to view synthesis<br>- Signaling information (IP address, ES PID, schedule information, etc.) respective to additional view video element that can be received via out-of-band (broadband, etc.) | - Signaling information respective to base view (channel, PID, etc.)<br>- Although video data are absent, condition information respective a virtual view point that can be rendered to view synthesis can be included – Ref. Exemplary embodiment of Table 7<br>- Configure fields so that a conventional legacy TV cannot receive the corresponding element (hidden channel, unknown service type, etc.) |

FIG. 24

| Syntax | Format |
|---|---|
| Stereo_3D_viewing_condition_info descriptor ( ) { | |
|     descriptor_tag | 8 |
|     descriptor_length | u(8) |
|     base_channel_number | u(20) |
|     base_program_number | u(16) |
|     base_source_id | u(16) |
|     base_network_id | u(16) |
|     base_PID | u(13) |
|     num_of_views | u(8) |
|     reserved | '1111111' |
|     for (j=0; j< num_of_views; j++) { | |
|         view_pair_ID | u(8) |
|         target_display_size | u(8) |
|         target_IOD | u(8) |
|         target_viewing_distance | u(8) |
|         rendered_param () | |
|     } | |
| } | |

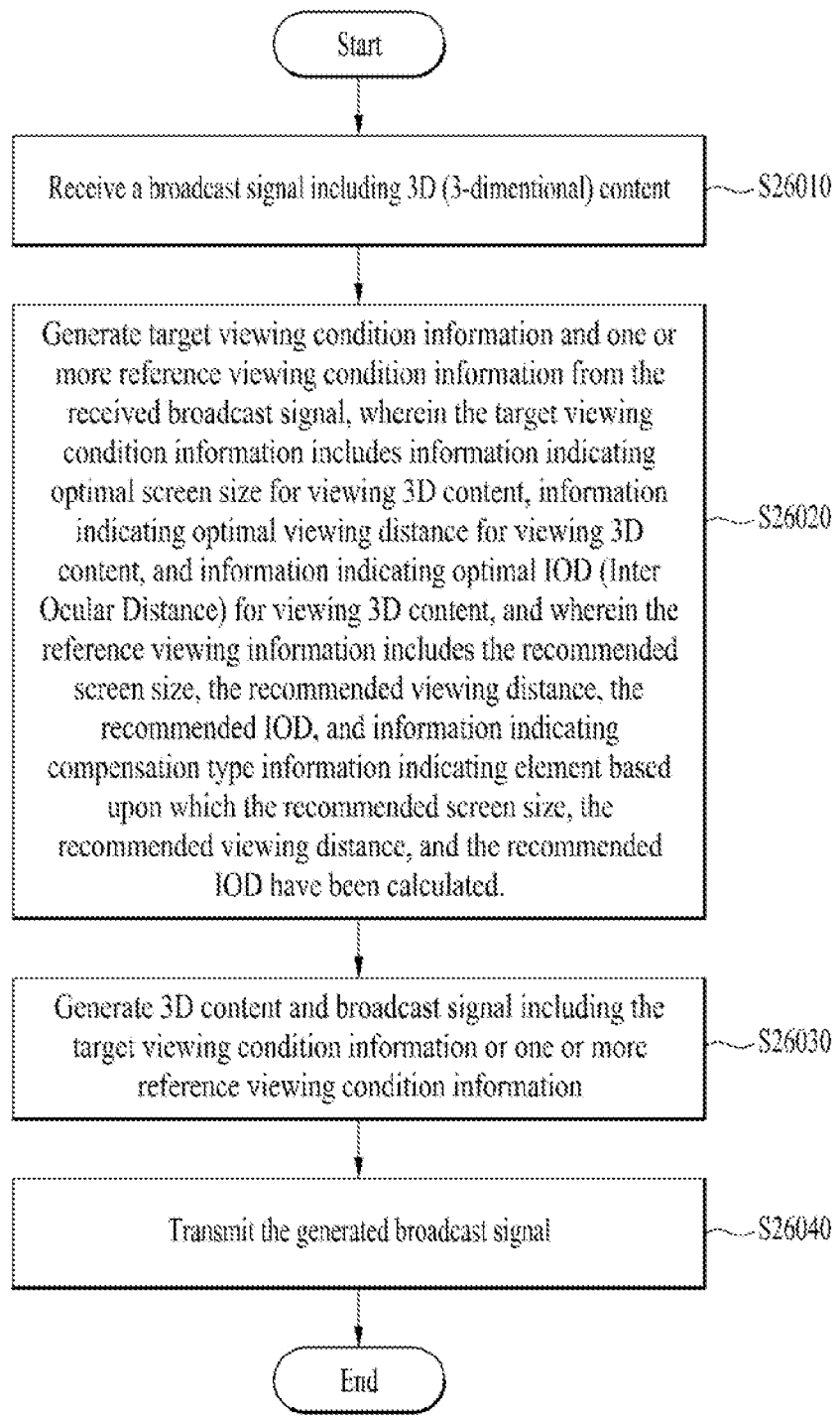

METHOD AND APPARATUS FOR PROCESSING BROADCAST SIGNALS FOR 3D BROADCAST SERVICE

CROSS REFERENCE TO RELATED APPLICATIONS

This application is the National Phase of PCT International Application No. PCT/KR2013/004983, filed on Jun. 5, 2013, which claims priority under 35 U.S.C. 119(e) to U.S. Provisional Application No. 61/655,491 filed on Jun. 5, 2012, all of which are hereby expressly incorporated by reference into the present application.

FIELD OF THE INVENTION

The present invention relates to a method and apparatus for providing a 3D (3-Dimensional) broadcast service. More specifically, the present invention relates to a method and apparatus for providing 3D broadcast content having a 3D effect, which is intended by a 3D content producer, to a viewer consuming 3D content in different viewing environments.

BACKGROUND ART

As the supply of 3-Dimensional Television (3DTV) has become common, in addition to the supply of 3-Dimensional (3D) content via storage media, the transmission of 3D image content via digital broadcasting is also becoming active.

Generally, a 3D image provides a 3D effect by using the principle of stereo view of both human eyes. Due to a parallax between both eye, in other words, due to a binocular parallax caused by a distance of approximately 65 mm between the eyes of a human being, man is capable of sensing depth perception, and, therefore, a 3D image provides a view allowing each of the user's left eye and right eye to view a respective flat image, thereby providing 3D effect and depth perception.

Such a 3D image display method includes a stereoscopic method, a volumetric method, a holographic methods, and so on. In case of the stereoscopic method, a left view image that is to be viewed by the left eye and a right view image that is to be viewed by the right eye are provided, and by allowing each of the left eye and the right eye to respectively view the left view image and the right view image through polarized glasses or the display device itself, the viewer may perceive a 3D image (or view) effect.

Meanwhile, if a broadcast receiver is capable of exactly reproducing the 3D effect that is intended by a 3D content producer, it may be the optimal image, however, depending upon the viewing condition, the 3D content that is configured of stereo images may actually display different 3D effects through the broadcast receiver. The current 3DTV receiver provides only limited 3D image that are fixed to a specific viewing condition. Therefore, the current viewers cannot fully and properly enjoy (or experience) the 3D effect intended by the 3D content producer, thereby causing a disadvantage of distinctively degrading the viewers' level of satisfaction on 3D contents.

DETAILED DESCRIPTION OF THE INVENTION

Technical Objects

In order to resolve the above-described problems, a technical object that is to be achieved by the present invention relates to having a broadcast receiver provide a 3D effect that was initially intended by a 3D content provider at the time when the corresponding content is produced regardless of a change in a viewing condition of each viewer.

Technical Solutions

An apparatus for processing 3D broadcast signals according to an exemplary embodiment of the present invention includes a tuner for receiving broadcast signals containing 3D content, a service information processor for parsing target viewing information and at least one reference viewing condition information received from the broadcast signals which are received, wherein the target viewing condition information includes information indicating an optimal screen size for viewing 3D content, information indicating an optimal viewing distance for viewing 3D content, and information indicating an optimal IOD (Inter Ocular Distance) for viewing 3D content, and wherein the reference viewing condition information includes information indicating a recommended screen size, a recommended viewing distance, a recommended IOD, and compensation-type information indicating an element based upon which the recommended screen size, the recommended viewing distance, and the recommended IOD have been calculated, a viewing analysis module for receiving viewing condition information of the viewer, parsing compensation-type information that is included in the reference viewing condition information, which contains information that is most relevant to the viewing condition information that is received, and for rendering the 3D content so that an element expressed by the correction-type information is maintained, and an output formatter for controlling so that the 3D content that is rendered is displayed.

Preferably, the service information processor parses the target viewing condition information and at least one reference viewing condition information from a SEI message, the SEI message being included in a video header of a video element for the 3D content.

Preferably, the service information processor parses the target viewing condition information and at least one reference viewing condition information from a stereo 3D rendering information descriptor being included in a PMT (Program Map Table).

Preferably, the service information processor parses the target viewing condition information and at least one reference viewing condition information from a stereo 3D rendering information descriptor being included in a VCT (Virtual Channel Table) or SDT (Service Description Table).

Preferably, the reference viewing condition information further includes reference parameter validity information indicating whether or not the recommended screen size, recommended viewing distance, or recommended IOD corresponds to valid information.

Preferably, the reference viewing condition information further includes compensation parameter information for rendering the 3D content based upon the reference viewing condition information.

Preferably, the compensation information includes information indicating a distance between cameras respectively capturing left image and right image of the 3D content.

A method for processing 3D broadcast signal transmission according to an exemplary embodiment of the present invention includes a step of generating 3D (3-dimensional) content, a step of generating target viewing condition information or one or more reference viewing condition information, wherein the target viewing condition information includes information indicating an optimal screen size for viewing 3D content, information indicating an optimal viewing distance for viewing 3D content, and information indicating an optimal IOD (Inter Ocular Distance) for viewing 3D content, and wherein the reference viewing condition information includes information indicating a recommended screen size, a recommended viewing distance, a recommended IOD, and compensation-type information indicating an element based upon which the recommended screen size, the recommended viewing distance, and the recommended IOD have been calculated, a step of generating a broadcast signal including the 3D content and the target viewing condition information or one or more reference viewing condition information, and a step of transmitting the generated broadcast signal.

Preferably, the step of generating a broadcast signal includes a step of inserting the target viewing condition information or one or more reference viewing condition information in a SEI message, the SEI message being included in a video header of a video element for the 3D content.

Preferably, the step of generating a broadcast signal includes a step of inserting the target viewing condition information or one or more reference viewing condition information in a PMT (Program Map Table) by including the information in a stereo 3D rendering information descriptor.

Preferably, the step of generating a broadcast signal includes a step of inserting the target viewing condition information or one or more reference viewing condition information in a VCT (Virtual Channel Table) or SDT (Service Description Table) by including the information in a stereo 3D rendering information descriptor.

Preferably, the reference viewing condition information further includes reference parameter validity information indicating whether or not the recommended screen size, recommended viewing distance, or recommended IOD corresponds to valid information.

Preferably, the reference viewing condition information further includes compensation parameter information for rendering the 3D content based upon the reference viewing condition information.

Preferably, the compensation information includes information indicating a distance between cameras respectively capturing left image and right image of the 3D content.

Effects of the Invention

According to the present invention, regardless of a viewing condition of a user, a 3D effect that was initially intended by a 3D content producer at a time when the corresponding content is produced may be provided to the user.

According to the present invention, while maintaining backward compatibility with a conventional (or legacy) broadcasting system architecture, the 3D effect that was initially intended by the 3D content producer at a time when the corresponding content is produced may be provided to the user.

According to the present invention, by having a receiver perform minimum data processing, the 3D effect that was initially intended by the 3D content producer at a time when the corresponding content is produced may be provided to the user.

BRIEF DESCRIPTION OF THE DRAWINGS

FIG. 10 illustrates a method of adjusting a disparity for maintaining a viewing distance according to an exemplary embodiment of the present invention.

FIG. 11 illustrates a method of performing depth adjustment, when received reference viewing condition information or/and target viewing condition information does/do not match with viewing condition information in a receiving end according to an exemplary embodiment of the present invention.

FIG. 12 illustrates a stereo 3D rendering information descriptor according to an exemplary embodiment of the present invention.

FIG. 13 illustrates a definition respective to a compensation_type field value according to an exemplary embodiment of the present invention.

FIG. 14 illustrates a View pair descriptor according to an exemplary embodiment of the present invention.

FIG. 15 illustrates part of a PMT (Program Map Table) according to an exemplary embodiment of the present invention.

FIG. 16 illustrates part of a VCT (Virtual Channel Table) according to an exemplary embodiment of the present invention.

FIG. 17 illustrates a SDT (Service Description Table) according to an exemplary embodiment of the present invention.

FIG. 18 illustrates a user_data_registered_itu_t_t35 ( ) according to an exemplary embodiment of the present invention.

FIG. 19 illustrates a user_identifier and its respective user_structure ( ) and DVB1_data ( ) according to an exemplary embodiment of the present invention.

FIG. 20 illustrates a stereo 3D rendering information SEI message according to an exemplary embodiment of the present invention.

FIG. 21 illustrates a stereo 3D rendering info SEI descriptor according to an exemplary embodiment of the present invention.

FIG. 23 illustrates a signaling scenario for providing a 3D image best-fitting a viewing condition according to an exemplary embodiment of the present invention.

FIG. 24 illustrates a stereo 3D viewing condition information descriptor according to an exemplary embodiment of the present invention.

FIG. 26 illustrates a method for processing a 3D broadcast signal according to an exemplary embodiment of the present invention.

BEST MODE FOR CARRYING OUT THE PRESENT INVENTION

Figure 1:
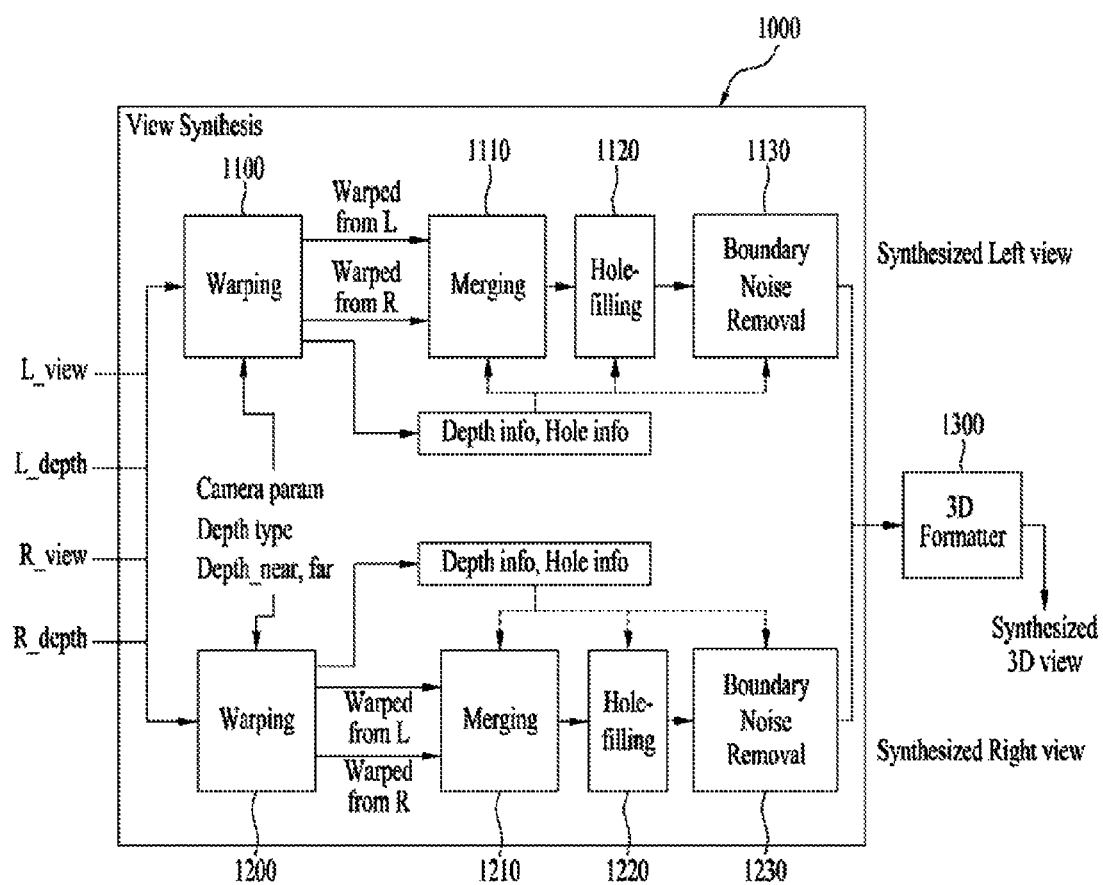
FIG. 1 illustrates a view synthesis module according to an exemplary embodiment of the present invention.

Preferred exemplary embodiments of the present invention that can achieve a detailed realization of the following objects described below will be described in detail with reference to the accompanying drawings. At this point, the configuration and operation of the present invention that are illustrated in the drawings and described with respect to the drawings are merely described as at least one exemplary embodiment, and, therefore, the technical scope and spirit of the present invention and its essential configuration and operation will not be limited only to this.

In addition, wherever possible, although the terms used in the present invention are selected from generally known and used terms based upon functions of the present invention, the terms used herein may be varied or modified in accordance with the intentions or practice of anyone skilled in the art, or along with the advent of a new technology. Additionally, in some particular cases, some of the terms mentioned in the description of the present invention may be selected by the applicant at his or her discretion, the detailed meanings of which are described in relevant parts of the description of the present invention. Furthermore, it is required that the terms of the present invention are to be defined, not simply by the actual terms used but also by the meaning of each term lying within, and also based upon the overall content of the present invention.

FIG. 1 illustrates a view synthesis module according to an exemplary embodiment of the present invention.

The viewing synthesis module (1000) according to the exemplary embodiment of the present invention includes a warping module (1100, 1200), a merging module (1110, 1210), a hole filling module (1120, 1220), and/or a Boundary Noise Removal module (1130, 1230).

The warping module (1100, 1200) corresponds to a device that is configured to process a left image and a right image by applying depth information respective to the left image and the right image by using camera parameter information, depth type information, depth_near information, and/or depth_far information. The camera parameter information includes information on cameras of a place where 3D content is being produced. The depth type information indicates a type providing the depth information respective to the left image and/or right image. For example, the depth type information may provide depth information by using a disparity value of objects being included in the left image and/or right image. Herein, disparity represents a horizontal difference between points respective to each of the left image and the right image for indicating the same point of a 3D image. The warping module (1100, 1200) receives left image and right image data and, then, receives left image depth information (L_depth) and right image depth information (R_depth) and, then, applies such information to each of the left image data and the right image data. The left image depth information (L_depth) and the right image depth information (R_depth) may be referred to as a depth map. During this procedure, the warping module (1100, 1200) may perform rendering on the left image and the right image by using the above-described camera parameter information, depth type information, depth_near information, and/or depth_far information.

Alternatively, the warping module (1100, 1200) may render (or perform rendering on) the left image and the right image by respectively applying the left image depth information and the right image depth information to the left image data and the right image data. Meanwhile, the warping module (1100, 1200) may generate depth information and/or image hole information by applying the camera parameter information, depth type information, depth_near information, and/or depth_far information on each of the left image depth information and the right image depth information.

The merging module (1110, 1210) performs a function of receiving the left image and right image, which are processed by the warping module, and performing rendering by applying image depth information on the left image and the right image, and outputting one of the left image and the right image. For example, one merging module (1110) may output the left image, and another merging module (1210) may output the right image.

The hole filling module (1120, 1220) may perform a process of compensating a hole, which may exist in the left image or the right image, by using image hole information.

The Boundary Noise Removal module (1130, 1230) performs a process of eliminating (or removing) noise, which may occur at a boundary area of the left image or right image.

A 3D formatter (1300) combines the left image and the right image, which are outputted from the viewing synthesis module (1000) and formats a 3D image.

In case the viewing synthesis module (1000) creates (or generates) new left image and right image and outputs a 3D image of an arbitrary (or random) view (or viewpoint), each image and depth map may undergo 4 steps, which are shown in the drawing. At this point, related information, such as camera parameter information or depth type information, and so on, may be provided for the processing procedure of each image and depth map.

Figure 2:
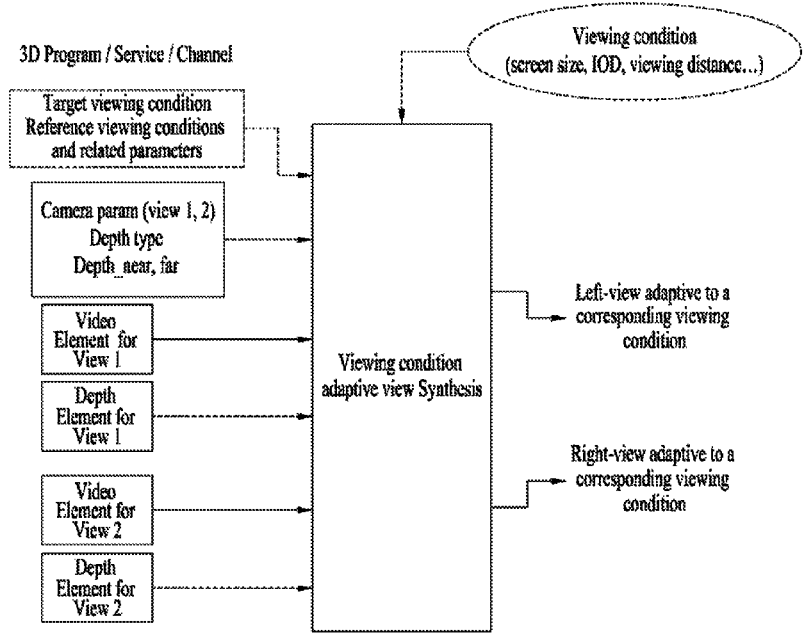
FIG. 2 illustrates a device providing a stereo image best-fitting (or adaptive to) a viewing condition according to an exemplary embodiment of the present invention.

FIG. 2 illustrates a device providing a stereo image best-fitting (or adaptive to) a viewing condition according to an exemplary embodiment of the present invention.

In case the receiving end selects an image of its own arbitrary view and applies view synthesis thereto, rendering respective to each image may be performed by using the information required for the viewing synthesis (e.g., camera parameter information, depth type information, depth_near information, and/or depth_far information). However, it is not possible to provide a 3D image best-fitting the viewing condition by using only the information mentioned above, and, in case the corresponding 3D image is intended to be provided, additional information is required. More specifically, information on a specific viewing condition, to which the currently received stereo image is being targeted, and guideline information corresponding to a case when another reference viewing condition is to be supported are required to be signaled.

In an exemplary embodiment of the present invention, guideline information, which can be transmitted from a transmitting end, and viewing condition information, which can be acquired from a receiving end, may both be inputted to the viewing synthesis module, and a new stereo image (image including a left image and a right image) may be generated based upon these two types of information. Target viewing condition information and Reference viewing condition information and/or parameter information related to the same may be included in the guideline information.

Viewing condition adaptive view synthesis may be performed by the viewing synthesis module. The viewing synthesis module may receive a video element for a first view, a video element for a second view, a depth element for a first view, a depth element for a second view, camera parameter information, depth type information, depth_near information, and/or depth_far information respective to the first view and the second view. The viewing synthesis module may perform rendering on a 3D image that does not take the viewing condition under consideration based upon such information.

The viewing synthesis module may additionally receive target viewing condition information, reference viewing condition information, viewing condition information, and the related parameters.

The target viewing condition information corresponds to information indicating a viewing condition that is targeted by a 3D content producer or broadcast transmitting end. The target viewing condition information may include a distance between the eyes of a targeted user, a distance between a targeted display screen and a targeted viewer, and/or size information of a targeted display device. By referring to the target viewing condition information, the receiving end may perform rendering on the 3D image as much as a difference between the target viewing condition information and the viewing condition of the receiving end. More specifically, rendering may be performed on the 3D image, so that details (or content) of the viewing condition, which is changed (or varied) based upon the target viewing condition information, can be covered.

The reference viewing condition information corresponds to information indicating a viewing condition that is presented as reference standard by a 3D content producer or broadcast transmitting end. More specifically, the reference viewing condition information may provide information on one or more reference viewing conditions, and, in each reference viewing condition, a parameter for rendering a 3D image may be transmitted from a transmitting end to a receiving end. The reference viewing condition information may include optimal distance between the eyes of the viewer, optimal distance between a display screen and the user's eyes, and optimal size information of the display device for displaying the 3D effect, which is intended by the 3D content producer or broadcast transmitting end. The receiving end may refers to the reference viewing condition information, which has the most similar information as the viewing condition information, and may then perform rendering on the 3D image as much as a difference between the reference viewing condition information and the viewing condition of the receiving end. More specifically, the 3D image may be rendered, so that details of the viewing condition, which are changed based upon the reference viewing condition information, can be covered.

The viewing condition information corresponds to information indicating a viewing environment of a 3D content, which is consumed by the viewer. The viewing condition information may include information, such as a size of a screen on which the 3D image is being displayed (screen size), a distance between both eyes of the viewer (IOD; Inter Ocular Distance), a distance between the screen and the viewer (viewing distance), and so on. The viewing synthesis module receives the viewing condition information from the receiver, and, in case target viewing condition information that matches with the viewing condition information exists, the viewing synthesis module may perform rendering on the 3D image by using a parameter for performing 3D image rendering that is related to the corresponding target viewing condition information. The viewing synthesis module receives the viewing condition information from the receiver, and, in case target viewing condition information or reference viewing condition information that matches with the viewing condition information does not exist, the viewing synthesis module may compare the reference viewing condition information with the viewing condition information and may, then, perform 3D image rendering that compensates for the difference between both information.

Figure 3:
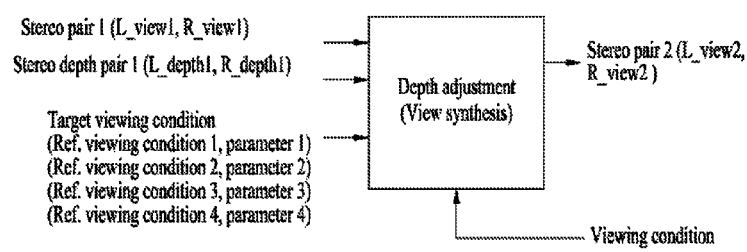
FIG. 3 illustrates operations of a receiver for the provision of the stereo image best-fitting the viewing condition according to an exemplary embodiment of the present invention.

FIG. 3 illustrates operations of a receiver for the provision of the stereo image best-fitting the viewing condition according to an exemplary embodiment of the present invention.

In case the viewing condition information matches with the target viewing condition information, for example, in case the viewing condition information, which is stored in or inputted to the receiving end, matches with target viewing condition information of a received Stereo pair 1, instead of performing any additional depth adjustment, the received input (stereo pair 1) is directly outputted (stereo pair 2).

In case the viewing condition information does not match with the target viewing condition information, for example, in case the target viewing condition information of Stereo pair 1 does not match with the viewing condition information, which is acquired (or obtained) by the receiver, among the received reference viewing condition information, the receiver searches for information matching with the acquired viewing condition information.

In case matching reference viewing condition information exists, by referring to a respective parameter value, depth adjustment (or 3D image rendering) may be performed, so as to create (or generate) a new stereo pair, thereby outputting the newly created stereo pair.

In case matching reference viewing condition information does not exist, among the provided reference viewing condition information, reference may be made to the reference viewing condition information that is most similar to the acquired viewing condition information, or reference may be made to the target viewing condition information, so as to calculate a parameter value that is adequate to the acquired viewing condition information, and stereo pair 2 may be created (or generated) by using this parameter value.

Figure 4:
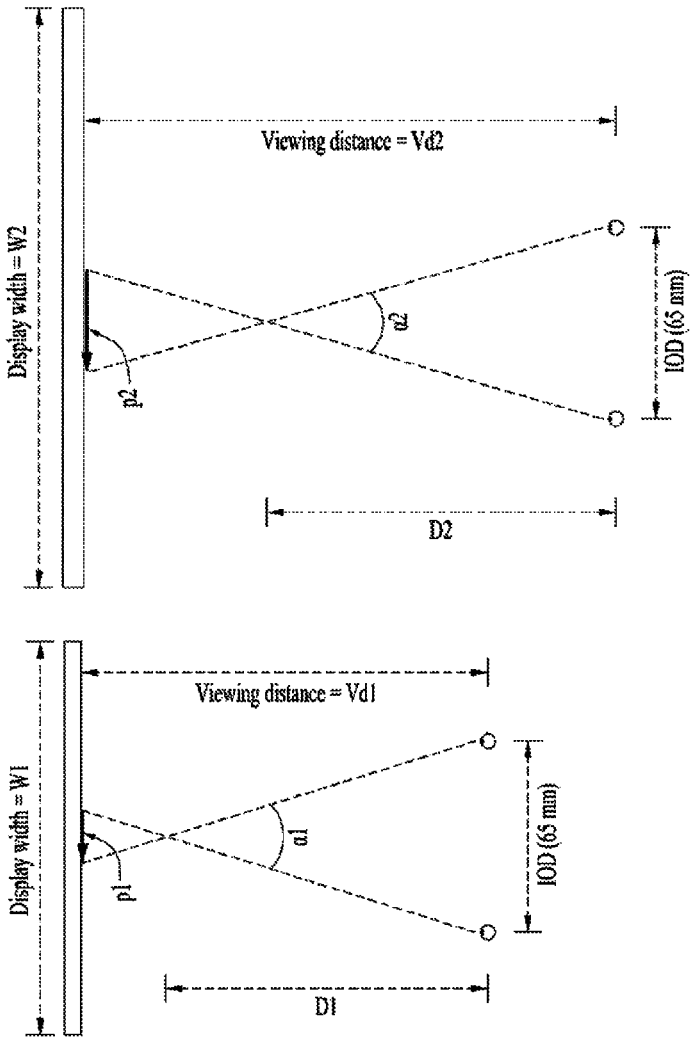
FIG. 4 illustrates a difference in 3D effect with respect to a screen size according to an exemplary embodiment of the present invention.

FIG. 4 illustrates a difference in 3D effect with respect to a screen size according to an exemplary embodiment of the present invention.

In case the same stereo content (3D content) is outputted to difference screen sizes, the respective parallax, viewing distance, and depth of the object that is recognized accordingly may vary.

As the screen size becomes smaller, a depth budget for displaying the same 3D effect becomes larger, and, conversely, as the screen size becomes larger, the depth budget for displaying the same 3D effect is consumed less. The depth budget refers to a fixed amount of 3D effect (or depth) that is included in a 3D image.

Referring to FIG. 4, in case the sizes of the screen respectively correspond to W1 and W2, it will be apparent that in order to sense the same depth, the parallax angle and viewing distance are required to be varied.

Figures 5, 6:
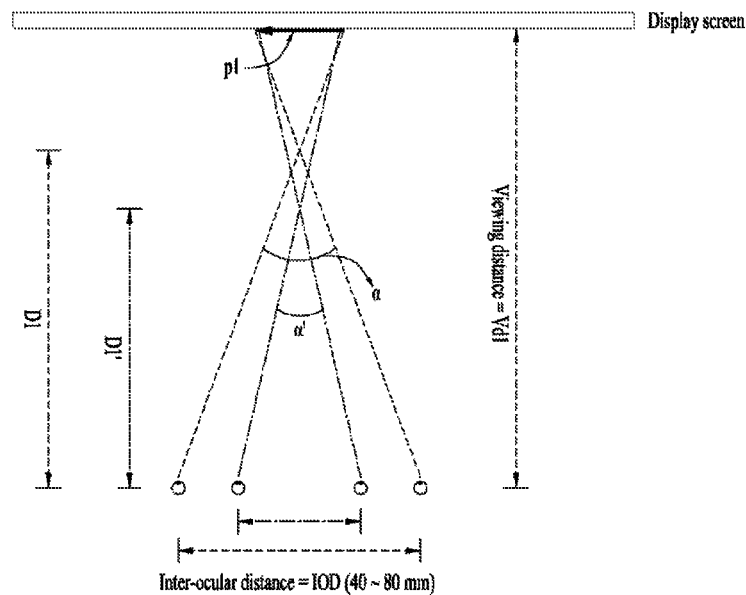
FIG. 5 illustrates a number of pixels required for displaying unlimited 3D effect with respect to the screen size according to an exemplary embodiment of the present invention.
FIG. 6 illustrates a difference in 3D effect with respect to IOD lengths according to an exemplary embodiment of the present invention.

FIG. 5 illustrates a number of pixels required for displaying unlimited 3D effect with respect to the screen size according to an exemplary embodiment of the present invention.

In order to determine the variation in the depth (or 3D effect) respective to each screen size, a comparison may be made between the numbers of pixels respective to the IOD (Inter Ocular Distance). Within the display screen, a depth (3D effect) corresponding to the parallax of the IOD(=65 mm) corresponds to an unlimited depth sinking to the back of the screen, and a depth corresponding to the parallax of 0 mm refers to a depth corresponding to the surface of the screen. Although the depth perception of the case when the parallax is equal to 0 always corresponds to a position directly above the screen regardless of the viewing condition, remaining parallaxes display different depth perceptions in accordance with the screen size. As shown in FIG. 5, when comparison is made between pixel numbers corresponding to the 65 mmm parallax for each of the diverse screen sizes, the number of pixels of a disparity for displaying the same 3D effect varies largely.

FIG. 6 illustrates a difference in 3D effect with respect to IOD lengths according to an exemplary embodiment of the present invention.

The stereo 3D effect may vary in accordance with the IOD size. More specifically, in case the viewer is a child, the IOD may generally be small, and the depth budget that is required for recognizing (or perceiving) the same 3D effect may also be small, and, conversely, in case the viewer is an adult having a larger IOD as compared to a child, the depth budget that is required for recognizing (or perceiving) the same 3D effect may be larger than that of a child.

As shown in FIG. 6, a depth (or depth perception) (D1) that is perceived with respect to the same parallax p1 varies in accordance with the IOD value. More specifically, in case of an adult, since the IOD length is longer than that of a child, the viewer may sense a 3D effect allowing the object to be seen as though the object exists at a D1 distance from the user, however, in case of a child having an IOD length respective to the same object that is shorter than that of an adult, the viewer may sense a 3D effect allowing the object to be seen as though the object exists at a D1' distance from the user.

Figure 7:
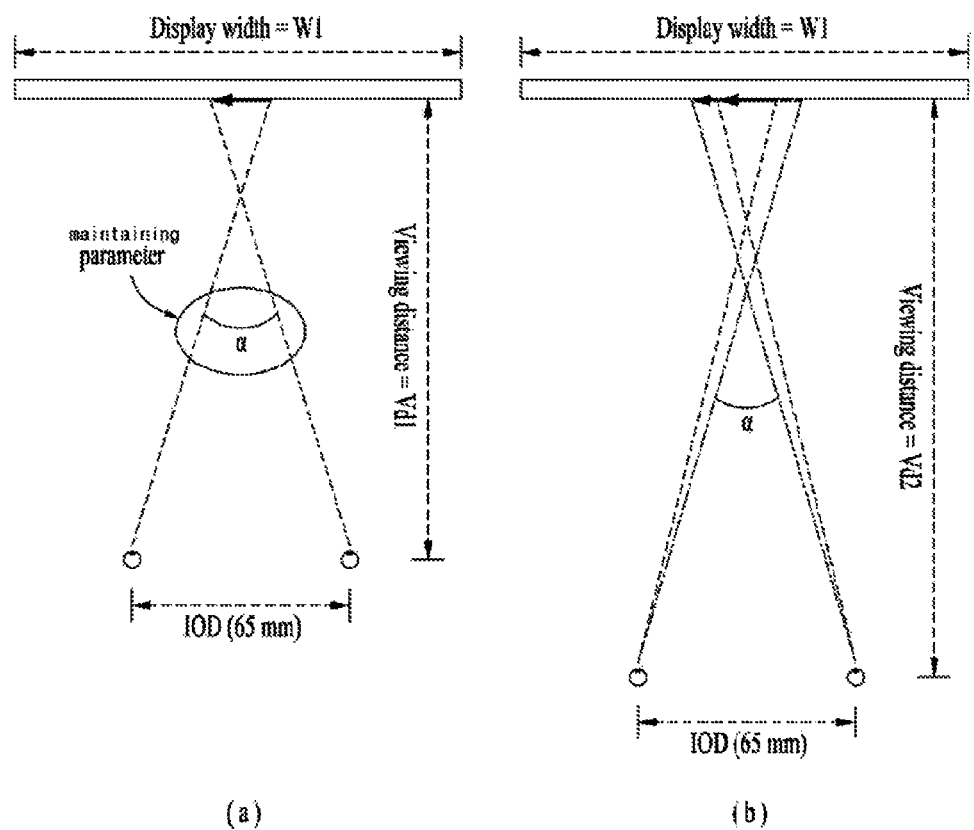
FIG. 7 illustrates a method of maintaining a vergence angle (alpha; a) in order to maintain the 3D effect, in case a viewing distance varies, according to an exemplary embodiment of the present invention.

FIG. 7 illustrates a method of maintaining a vergence angle (alpha; a) in order to maintain the 3D effect, in case a viewing distance varies, according to an exemplary embodiment of the present invention.

For a viewing distance respective to a 2D image, since a recommended viewing distance decided by the ITU-R for each resolution exists, the transmitting end and the receiving end may set this as a reference standard. Conversely, in case of a stereo content (3D content), a difference may occur in a depth being perceived in accordance with the viewing distance, and a reference standard respective to the viewing distance is not proposed. Therefore, information on a viewing distance, which is set as a reference standard by the transmitting end, is transmitted to the receiving end, and the receiving end may refer to this information.

As described above, since a 3D effect of a stereo content caries in accordance with the viewing condition, such as screen size, IOD, viewing distance, and so on, in order to appropriately deliver the 3D effect intended by the 3D content producer or broadcasting station, a method for providing 3D content allowing the 3D effect to be adjusted in accordance with each viewing condition is being required.

When the 3D effect of the stereo image is to be maintained, elements being maintained may vary, and diverse methods may exist for maintaining the 3D effect accordingly. For example, a Vergence angle may be maintained. In another example, a Parallax angle may be maintained. The parallax angle may be defined as a value subtracting the vergence angle from an accommodation angle. When the viewer stares at a specific point on the screen, the accommodation angle represents an angle between two segments, each consisting of a straight line connecting each eye to the respective viewing point. In yet another example, a viewing distance range (e.g., Dmin, Dmax) may be maintained with reference to the viewer (or based upon the viewer). In yet another example, a viewing distance range (e.g., |Dmin Dmax|) may be maintained with reference to the screen (or based upon the screen). In yet another example, there may exist a method of maintaining a relative viewing distance range.

In case of a method for compensating a 3D effect (depth) of a 3D content, since a difference may occur in the adjustment value depending upon the element that is to be maintained, when information on the element based upon which the provided reference viewing condition information and its respective reference compensation parameter have been calculated, i.e., information on the compensation type, is provided to the receiving end from the transmitting end, the receiving end may use this information.

FIG. 7 corresponds to a drawing illustrating a case when the Vergence angle is being maintained. In case other viewing conditions are identical, when the viewing distance becomes larger, an absolute value of the disparity (or parallax) is required to be increased accordingly. For example, in (a) of FIG. 7, in case the element that is to be maintained corresponds to a (alpha), and, in case the viewing distance increases, as shown in (b) of FIG. 7, in order to maintain a, arrows on the screen (indicating the parallax) are also required to be increased.

In case other viewing conditions are identical, when the screen size becomes larger, an absolute value of the disparity is required to be decreased accordingly. At this point, the parallax should be maintained.

In case other viewing conditions are identical, when the IOD becomes larger, an absolute value of the disparity (or parallax) is required to be decreased accordingly.

Figure 8:
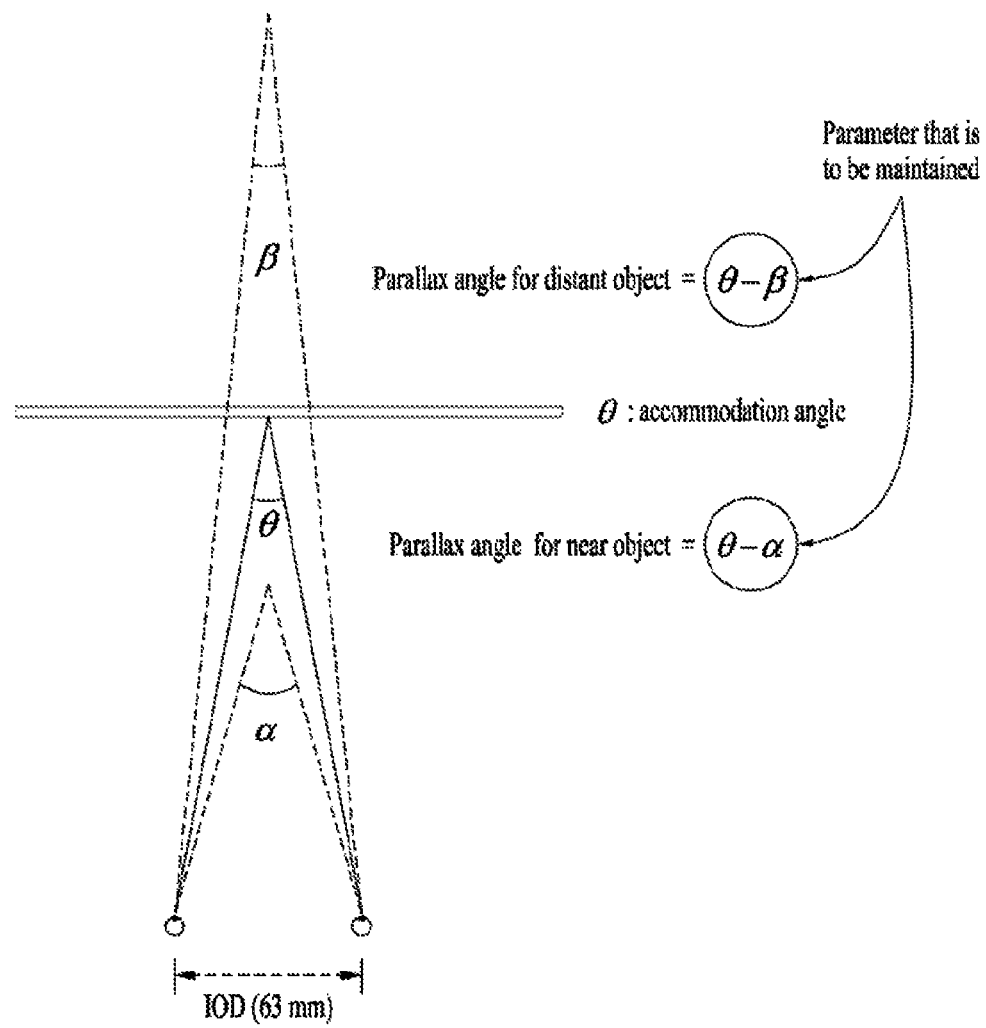
FIG. 8 illustrates a method of maintaining a parallax angle according to an exemplary embodiment of the present invention.

FIG. 8 illustrates a method of maintaining a parallax angle according to an exemplary embodiment of the present invention.

When the viewing distance becomes larger, an absolute value of the disparity (or parallax) is required to be increased accordingly. Nevertheless, in case the viewing distance increases to 4 m or more, a change may not occur in a maximum disparity value with respect to such increase.

In case other viewing conditions are identical, when the screen size becomes larger, the absolute value of the disparity is also required to be decreased in proportion to such increase. At this point, the parallax may be maintained.

The disparity (or parallax) may be maintained regardless of a change in the IOD size.

The parallax angle may be defined as a value subtracting the vergence angle from an accommodation angle (theta). When the viewer is focusing on a specific point of the screen, the accommodation angle may be defined as an angle formed between two segments, each consisting of a straight line connecting each eye to the respective viewing point. The vergence angle includes a vergence angle (beta) corresponding to when the viewer is focusing on a distant image and a vergence angle (alpha) corresponding to when the viewer is focusing on a near image.

According to the exemplary embodiment of the present invention, the parallax angle should be maintained between an angle subtracting a beta angle value from the accommodation angle and an angle subtracting an alpha angle value from the accommodation angle. In case of viewing an image deviating from the above-described parallax angle range, this may cause the user to experience a sense of fatigue.

Figure 9:
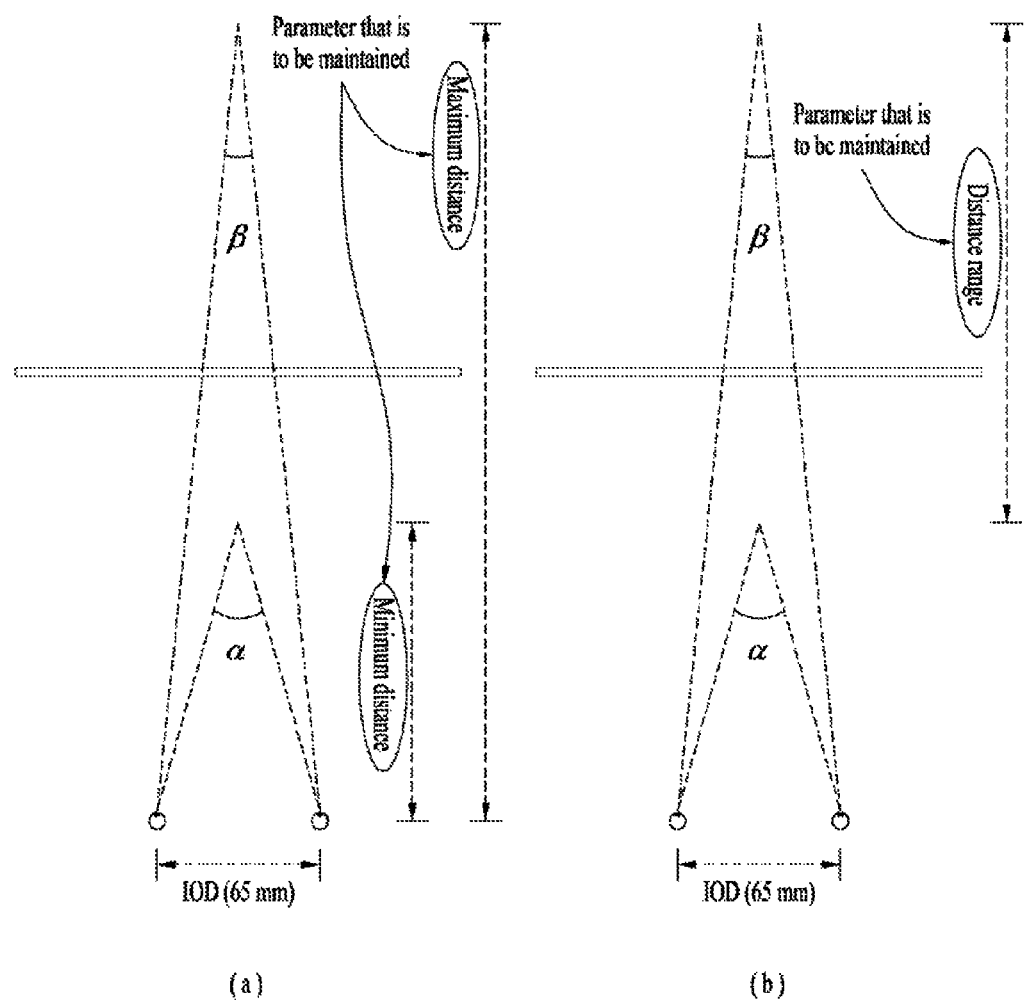
FIG. 9 illustrates a method of maintaining a viewing distance according to an exemplary embodiment of the present invention.

FIG. 9 illustrates a method of maintaining a viewing distance according to an exemplary embodiment of the present invention.

The method of maintaining the viewing distance includes a method of maintaining the viewing distance based upon the viewer and a method of maintaining the viewing distance based upon the screen.

Referring to (a) of FIG. 9, when the viewer is focusing on a most distant image, a distance between both eyes of the user and the most distant image may be defined as a maximum distance (Dmax), and, when the viewer is focusing on a nearest image, a distance between both eyes of the user and the nearest image may be defined as a minimum distance (Dmin). The method of maintaining the viewing distance based upon the viewer may correspond to a method of maintaining the distance so that a 3D effect can be displayed between the above-mentioned minimum distance and maximum distance. More specifically, the 3D effect may be maintained by maintaining the target minimum distance and the target maximum distance even id the viewing condition is changed.

In case other viewing conditions are identical, when the viewing distance becomes larger, an absolute value of the disparity (or parallax) is required to be increased accordingly.

In case other viewing conditions are identical, when the screen size becomes larger, the absolute value of the disparity is also required to be decreased in proportion to such increase. At this point, the parallax may be maintained.

When the IOD increases, an absolute value of the disparity (or parallax) is required to be increased accordingly.

Referring to (b) of FIG. 9, a distance range may be maintained based upon the screen (or with reference to the screen). This refers to a method of maintaining an absolute value of the Distance range, i.e., a value subtracting a minimum distance from a maximum distance.

In case other viewing conditions are identical, when the viewing distance becomes larger, an absolute value of the disparity (or parallax) is required to be increased accordingly.

In case other viewing conditions are identical, when the screen size becomes larger, the absolute value of the disparity is also required to be decreased in proportion to such increase. At this point, the parallax may be maintained.

When the IOD increases, an absolute value of the disparity (or parallax) is required to be increased accordingly.

FIG. 10 illustrates a method of adjusting a disparity for maintaining a viewing distance according to an exemplary embodiment of the present invention.

According to the exemplary embodiment of the present invention, when the viewing distance is maintained by using a proportional expression of a triangle, the disparity value may be adjusted in accordance with the viewing condition.

Additionally, depending upon the compensation type, a value being applied to a compensation parameter for rendering may also vary, and, by using this information, the receiver may select information related to the compensation type best-fitting (or adaptive to) the viewing environment and may apply the selected information.

FIG. 11 illustrates a method of performing depth adjustment, when received reference viewing condition information or/and target viewing condition information does/do not match with viewing condition information in a receiving end according to an exemplary embodiment of the present invention.

As described above, a method of adjusting the disparity in accordance with a change in the viewing condition may also be applied to a deduction of a baseline value, which is appropriate to the receiving end, when a signaled parameter for depth adjustment does not exist. Herein, at the time when the 3D content is created, the baseline value may refer to a distance between cameras respectively capturing each of the left image and the right image, which are included in the 3D content.

According to the exemplary embodiment of the present invention, in case information respective to the parameter (i.e., baseline) that is to be adjusted does not exist, the receiving end may refer to signaled target viewing condition information (or reference viewing condition information) and its respective rendering parameter value, thereby being capable of deducing a new parameter that is appropriate to the viewing condition of the receiving end. More specifically, in case the viewing distance, screen size, and/or IOD value have changed from the initial values, a new disparity may be deduced by determining a relation as to how the disparity is to be applied with respect to such change, and a baseline value that is to be adjusted based upon the new disparity value may be deduced.

As shown in FIG. 11, based upon a relation between an old disparity and a new disparity, a baseline value may be deduced by using a proportional expression of a triangle. The deduced baseline value may be used as a value for adjusting a pixel position or a number of pixels for displaying a specific image respective to each of the left image and the right image.

FIG. 12 illustrates a stereo 3D rendering information descriptor according to an exemplary embodiment of the present invention.

The stereo 3D rendering information descriptor may include the above-described target viewing condition information, reference viewing condition information and/or the related parameter information (compensation parameter).

The stereo 3D rendering information descriptor may include a view_pair_ID field, a target_parameter_valid_flag field, a target_display_size field, a target_IOD field, a target_viewing_distance field, a rendered_param ( ) field, a num_of_references field, a ref_parameter_valid_flag field, a compensation_type field, a ref_display_size field, a ref_IOD field, a ref_viewing_distance field, and/or a ref_compensation_param ( ) field.

The view_pair_ID field corresponds to an identifier that can identify a stereo view that is currently being received, and, by using this value, it may be possible to identify to which specific Elementary Stream (ES) the left image and/or right image included in the stereo image are configured. The view_pair_ID field may be used in association with a view_pair_descriptor, which will be described later on.

The target_parameter_valid_flag field identifies validity of viewing condition fields that are related to a base view video stream and/or an additional view video stream.

The target_display_size field refers to a recommended display size that is optimized to the stereo content, which is being transmitted. And, in case the aspect ratio is fixed, the target_display_size field may use values corresponding to diagonal lengths 47 inches, 55 inches, and so on. The target_display_size field may be expressed as a distance of a display width. The target_display_size field may be processed to be significant only when a first bit of the target_parameter_valid_flag is equal to '1'.

The target_IOD field refers to an IOD (Inter Ocular Distance) that is optimized to the stereo content, which is being transmitted. Generally, the IOD is distributed within a range of 40~80 mm. The target_display_size field may be processed to be significant only when a second bit of the target_parameter_valid_flag is equal to '1'.

The target_viewing_distance field indicates a recommended viewing distance that is optimized for viewing the stereo content, which is being transmitted. The target_viewing_distance field may be processed to be significant only when a third bit of the target_parameter_valid_flag is equal to '1'.

The rendered_param ( ) field, this value may include a value that can be referred to when the receiver newly renders the stereo content. And, the most typical value that may be included in the rendered_param ( ) field corresponds to a baseline distance between two cameras respectively capturing each of the left image and the right image, when producing the stereo content, which is being transmitted, and, in addition to this, other parameters for compensating the stereo image may also be defined. The rendered_param ( ) field may be processed to be significant only when a fourth bit of the target_parameter_valid_flag is equal to '1'.

The num_of_references field corresponds to a number of guide information (reference viewing condition information and the respective parameter sets) that are required for generating (or creating) a virtual view.

The ref_parameter_valid_flag field may indicate the validity of fields of the reference viewing condition information being are related to the generation (or creation) of a virtual view.

The compensation_type field indicates based upon which factor (or element) the reference viewing condition and compensation parameter, which are being provided, have been calculated.

Although the ref_display_size field does not correspond to a value optimized to the stereo content, which is being transmitted, the field indicates a display size (screen size) that can be referred to in accordance with a receiving end condition. The ref_display_size field may be processed to be significant only when a first bit of the ref_parameter_valid_flag is equal to '1'.

The ref_IOD field does not correspond to a value optimized to the stereo content, which is being transmitted, however, the field indicates an IOD that can be referred to in accordance with a receiving end condition. The ref_IOD field may be processed to be significant only when a second bit of the ref_parameter_valid_flag is equal to '1'.

The ref_viewing_distance field does not correspond to a value optimized to the stereo content, which is being transmitted, however, the field indicates an IOD that can be referred to in accordance with a receiving end condition. The ref_viewing_distance field may be processed to be significant only when a third bit of the ref_parameter_specified_flag is equal to '1'.

The ref_compensation_param ( ) field corresponds to a value that can be referred to when the receiver newly renders the stereo content, and this field includes a compensation parameter corresponding to the respective reference viewing condition information. The ref_compensation_param ( ) field may be processed to be significant only when a fourth bit of the ref_parameter_valid_flag is equal to '1'.

A most typical value being included in the ref_compensation_param ( ) corresponds to a baseline distance between two cameras respectively capturing each of the left image and the right image, when producing the stereo content, which is being transmitted. For example, a ref_baseline_distance field may be included in the ref_compensation_param ( ), and this indicates baseline information for analyzing (or synthesizing) a 3D image, which is optimized for the respective reference viewing condition information. In addition to this, other parameters for compensating the stereo image may also be included in the ref_compensation_param ( ).

FIG. 13 illustrates a definition respective to a compensation_type field value according to an exemplary embodiment of the present invention.

When the value of the compensation_type field is set to '0x00', this indicates that the reference viewing condition information and the compensation parameter related to this condition are calculated as a condition for maintaining an element that is referred to as a vergence angle.

When the value of the compensation_type field is set to '0x01', this indicates that the reference viewing condition information and the compensation parameter related to this condition are calculated as a condition for maintaining an element that is referred to as a parallax angle.

When the value of the compensation_type field is set to '0x02', this indicates that the reference viewing condition information and the compensation parameter related to this condition are calculated as a condition for maintaining an element that is referred to as a viewing distance based upon the viewer.

When the value of the compensation_type field is set to '0x03', this indicates that the reference viewing condition information and the compensation parameter related to this condition are calculated as a condition for maintaining an element that is referred to as a viewing distance based upon the screen.

Values '0x04' to '0x07' of the compensation_type field correspond to values that are reserved for future usage.

FIG. 14 illustrates a View pair descriptor according to an exemplary embodiment of the present invention.

By using the view_pair_ID field, the receiver may associate and process the stereo 3D rendering information descriptor and the View pair descriptor.

The View pair descriptor includes a num_of_view_pairs field, a view_pair_ID field, a left_PID field, and/or a right_PID field.

The num_of_view_pairs field indicates a number of stereo image pairs being included in a program.

The view_pair_ID field corresponds to an identifier than can identify each stereo image pair, and, by using this value, a specific ES stream to which the left image or right image, which is included, is configured may be identified.

The left_PID field indicates a PID value of an image corresponding to a left image.

The right_PID field indicates a PID value of an image corresponding to a right image.

In addition to PID information of the left image and/or the right image, the View pair descriptor may further include PID information that can respectively identify each stream including depth information on the left image and/or depth information on the right image.

FIG. 15 illustrates part of a PMT (Program Map Table) according to an exemplary embodiment of the present invention.

The above-described stereo 3D rendering information descriptor may be included in the PMT, and, in this case, the stereo 3D rendering information descriptor may perform program level signaling (option 1). In this case, the stereo 3D rendering information descriptor transmits the target viewing condition information, reference viewing condition information and/or the related compensation parameter respective to the stereo image, which is included in the program. Referring to FIG. 15, in case of option 1, a position of the stereo 3D rendering information descriptor within the PMT may be known.

Alternatively, the stereo 3D rendering information descriptor may also signal the corresponding information at an elementary stream (ES) level corresponding to a depth stream (option 2). Referring to FIG. 15, in case of option 2, a position of the stereo 3D rendering information descriptor within the PMT may be known.

Alternatively, the stereo 3D rendering information descriptor may signal the corresponding information from an ES level loop, which corresponds to a video elementary stream respective to depth (option 2). Referring to FIG. 15, in case of option 3, a position of the stereo 3D rendering information descriptor within the PMT may be known.

The ES transmitting the stereo image, which is included in the program, may be signaled through a program level view_pair_descriptor. In this case; the view_pair_descriptor may be transmitted by being included in the PMT.

FIG. 16 illustrates part of a VCT (Virtual Channel Table) according to an exemplary embodiment of the present invention.

The stereo 3D rendering information descriptor may be transmitted by being included in the TVCT. In this case, the stereo 3D rendering information descriptor may be located in a channel level descriptor loop. (Option 1)

Alternatively, the stereo 3D rendering information descriptor may be located in a conventional (or legacy) component list descriptor (Option 2), or, by extending a service location descriptor, fields of the stereo 3D rendering information descriptor may be included herein. (Option 3)

The ES, which transmits the stereo image included in the channel, may perform signaling through a channel level view_pair_descriptor.

FIG. 17 illustrates a SDT (Service Description Table) according to an exemplary embodiment of the present invention.

The SDT (service description table) corresponds to a table, which describes services included in a specific transport stream in a DVB_SI.

The SDT according to the exemplary embodiment of the present invention includes a table_id field, a section_syntax_indicator field, a section_length field, a transport_stream_id field, a version_number field, a current_next_indicator field, a section_number field, a last_section_number field, an original_network_id field, a service_id field, an EIT_schedule_flag field, an EIT_present_following_flag field, a running_status field, a free_CA_mode field, a descriptors_loop_length field, a descriptor ( ) field, and/or a CRC_32 field.

The table_id field is an 8-bit field indicating that this section belongs to the Service Description Table.

The section_syntax_indicator field is a 1-bit field being set to 1.

The section_length field is a 12-bit field, wherein the first two bits are set to 00. This field indicates the number of bytes starting from this field to a section including the CRC. A total section length of this filed cannot exceed 1021 and is equal to a maximum of 1024 bytes.

The transport_stream_id field is a 16-bit field, which performs a function of a label for identifying a TS.

The version_number field is a 5-bit field, which indicates a version number of a sub_table.

The current_next_indicator field is assigned with 1 bit, and, when the sub_table is the currently applicable, the field is set to 1. In case the field is set to 0, this indicates that the sub_table is not yet applicable and also indicates that a next table is valid.

The section_number field is assigned with 8 bits and indicates a number of sections. A first section is given a value of 0x00, and the value is incremented by 1 for each additional section having the same table_id, the same transport_stream_id, and the same original_network_id.

The last_section_number field is assigned with 8 bits and indicates a number of a last section (i.e., a highest section_number field) of the respective sub_table, wherein this section corresponds to a portion of the sub_table.

The original_network_id field is a 16-bit field, which corresponds to a label for verifying a network_id of the transmitting system.

The service_id field is a 16-bit field, which functions as a label differentiating the corresponding service from other services included in the TS. This is identical to the program_number of the program_map_section.

The EIT_schedule_flag field is a 1-bit field, which, when set to 1, indicates that EIT schedule information for the corresponding service is included in the current TS. When set to 0, this indicates that the service is not included.

The EIT_present_following_flag field is a 1-bit field, which, when set to 1, indicates that EIT_present_following information for the corresponding service is included in the current TS. When set to 0, this indicates that the EIT_present_following information is not included in the current TS.

The running_status field is a 3-bit field, which indicates a status of the service.

The free_CA_mode field is a 1-bit field, which, when set to 0, indicates that all of the component streams of the corresponding service are not scrambled. When set to 1, this indicates that one or more streams are being controlled by a CA system.

The descriptors_loop_length field is a 12-bit field, which indicates a total length of the following descriptors in byte units.

The Descriptor ( ) field may include a descriptor respective to a service. The above-described stereo 3D rendering information descriptor and/or view_pair_descriptor may be included the above-mentioned descriptor ( ) field.

The CRC_32 field is a 32-bit field, which indicates a CRC value for a zero output of a register in a decoder.

FIG. 18 illustrates a user_data_registered_itu_t_t35 ( ) according to an exemplary embodiment of the present invention.

The information being included in the stereo 3D rendering information descriptor may be transmitted through a video section.

In case of a H.264 (or AVC) video, the information being included in the stereo 3D rendering information descriptor may be transmitted by being included in a SEI (Supplemental Enhancement Information) section. In this case, a user_identifier and a user_structure may be included in a user_data_registered_itu_t_135( ). More specifically, the corresponding information is transported from a SEI payload instead of the user_data( ). The SEI performs the function of picture extension and user data of MPEG-2 and may also similarly configure the location.

FIG. 19 illustrates a user_identifier and its respective user_structure ( ) and DVB1_data ( ) according to an exemplary embodiment of the present invention.

Referring to (a) of FIG. 19, in case the user_identifier has a value of '0x4741 3934 (GA94)', the user_structure ( ) includes DVB1_data ( ).

Referring to (b) of FIG. 19, the DVB1_data ( ) may include a user_data_type_code and/or a user_data_type_structure ( ).

The user_data_type_code indicates different types of data being carried (or loaded) in the user_data_type_structure ( ).

According to the exemplary embodiment of the present invention, the user_data_type_structure ( ) may include information being included in the above-described stereo 3D rendering information descriptor.

FIG. 20 illustrates a stereo 3D rendering information SEI message according to an exemplary embodiment of the present invention.

The stereo 3D rendering information SEI message may be included in the above-described user_data_type_structure ( ).

The stereo 3D rendering information SEI message includes a stereo_3D_rendering_info_id field, a stereo_3D_rendering_info_cancel_flag field, a view_pair_id field, a target_parameter_valid_flag field, a target_display_size field, a target_IOD field, a target_viewing_distance field, a rendered_param ( ) field, a num_of_references field, a ref_parameter_valid_flag field, a compensation_type field, a ref_display_size field, a ref_IOD field, a ref_viewing_distance field, and/or ref_compensation_param ( ) field.

A value of the view_pair_ID field is associated with information included in the view_pair_descriptor of a program level, a channel level, and/or a service level and performs a function of allowing reference to be made to information included in the view_pair_descriptor. Instead of the view_pair_ID field, the PID of the ES respective to each of the left image and the right image may also be directly signaled.

A Stereo_3D_rendering_info_id field indicates an identification number for identifying information combination, which is included in a stereo 3D rendering info SEI message.

In a Stereo_3D_rendering_info_cancel_flag field, in case a value of this field is equal to '1', this indicates that the Stereo 3D rendering info, which has been applied up to a previous picture, is no longer being applied.

A Stereo 3D rendering info SEI message field indicates a method for transporting Stereo_3D_rendering_info_data in order to notify information related to Stereo 3D rendering at a video level.

The description of the remaining fields will be replaced with the description of each field described above in FIG. 12.

In case the stereo_3D_rendering info SEI message is included in video data or a depth stream, 3D information on an image of the corresponding stream may be signaled through the stereo_3D_rendering_info_data.

The stereo_3D_rendering_info_data ( ) may be received through SEI RBSP (raw byte sequence payload). After parsing an AVC NAL unit, when a nal_unit_type value is equal to 6, this corresponds to SEI data, and a user_identifier value is verified by reading a user_data_registered_itu_t35 SEI message having a payloadType value of 4. The receiver extracts data having a user_data_type_code of 0x12 by reading a user_structure ( ), wherein the user_identifier value corresponds to 0x47413934. By parsing the stereo_3D_rendering_info_data ( ) from the corresponding data, the receiver acquires information related to the 3D image viewing condition and information for future virtual 3D image generation.

FIG. 21 illustrates a stereo 3D rendering info SEI descriptor according to an exemplary embodiment of the present invention.

The Stereo 3D rendering info SEI descriptor may be located at a Program level or ES level of the PMT, and signaling information is provided, so that information on whether or not a Stereo 3D rendering Info SEI message is included in the corresponding video can be notified in advance by the receiver at the system level.

The Stereo 3D rendering info SEI descriptor may include a Stereo_3D_rendering_info_SEI_message_exist_flag field.

The Stereo_3D_rendering_info_SEI_message_exist_flag field indicates whether or not a stereo 3D rendering SEI message, which can notify in detail information related to stereo 3D rendering, is included in the received video stream.

Figure 22:
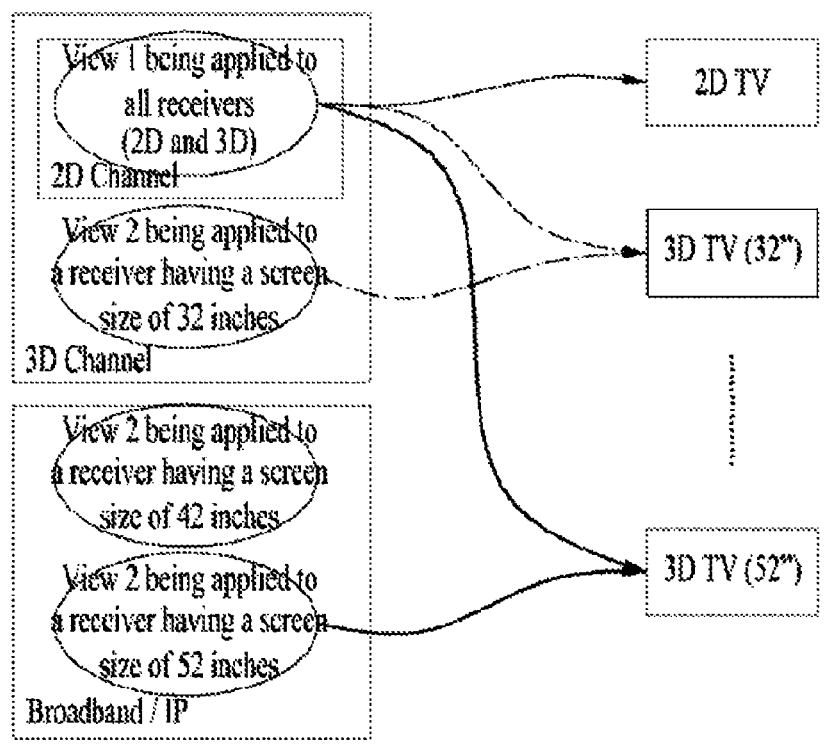
FIG. 22 illustrates a method of providing a stereo image best-fitting a screen size according to an exemplary embodiment of the present invention.

FIG. 22 illustrates a method of providing a stereo image best-fitting a screen size according to an exemplary embodiment of the present invention.

In case viewing conditions having high distribution levels are selected in advance, and in case the transmitting end creates in advance the best-fitting (or adaptive) contents, in order to minimize resource, such as a Bandwidth that is required for transmitting all Stereo view pairs respective to each case, the transmitting end may fix and transmit only one image and may variably transmit the remaining images to best-fit (or be adaptive to) the respective screen size.

For example, video elements being used by all receivers may be transmitted through a 2D channel regardless of the screen size of the receiver, and video elements including images best-fitting each screen size may be transmitted through a 3D channel. Among the images being transmitted through the 2D channel and the images being transmitted through the 3D channel, the receiver may combine images best-fitting its screen size and may render a 3D image best-fitting its screen size.

A video element including an image for a large screen may be transmitted through the internet.

For example, the transmitting end may transmit a video element, which includes an image for a receiver having a screen size of 32 inches, through a broadcast network, and the transmitting end may transmit a video element, which includes an image for a receiver having a screen size of 42 inches or 52 inches, through the internet.

FIG. 23 illustrates a signaling scenario for providing a 3D image best-fitting a viewing condition according to an exemplary embodiment of the present invention.

In case a stereo image is transmitted through a broadcast network, signaling for the stereo image may be performed through a PMT program level, a TVCT channel level, a SDT service level, an EIT event level, and/or a video header of a video element. In case the signaling is performed through the video header of the video element, information required for the signaling may be included in the SEI message.

In case a stereo image is transmitted through a broadcast network, the 2D channel may transmit a base view video element, and the 3D channel may transmit an additional view video element that can render a 3D image in combination with the base view video element, which is transmitted from the 2D channel, or the 3D channel may transmit the base view video element along with the additional view video element.

In case a stereo image is transmitted through a broadcast network, information related to a target viewing condition (e.g., viewing distance, screen size, IOD, and so on) respective to a combination of the base view video element and the additional view video element may be provided via signaling. In case of the 2D channel, omitted the above-described information may not be provided. Although video data are not included in the signaling information, condition information respective to a virtual view point that can be rendered by performing stereo image synthesis (or analysis) may be included. Information on an additional view video element (e.g., IP address, ES PID, schedule information, and so on, providing the corresponding video element), which can be received via out-of-band (broadband, and so on) may be included in the signaling information.

In case an additional view video element for a stereo image is transmitted through the internet or another channel (e.g., a non-real time-time channel), and, in case of using the internet, IP layer signaling and/or video level signaling may be performed, and, in case of using another channel, signaling for the additional view video element may be performed through the PMT program level, the TVCT channel level, the SDT service level, the EIT event level, and/or the video header of a video element. In case of performing signaling through the video header of the video element, information required for signaling may be included in the SEI message.

In case an additional view video element for a stereo image is transmitted through the internet or another channel, signaling information respective to a base image (e.g., channel information, PID, and so on) may be transmitted through the above-mentioned signaling. Although video data do not exist in the signaling information, condition information respective to a virtual view point that can be rendered via stereo image synthesis (or analysis) may be included in the signaling information. Reference may be made to FIG. 24 and the respective description for details on the condition information. A field that is configured to prevent the additional view video element or its related signaling information from being received by a legacy receiver may be included in the signaling information. Examples of such field may include a hidden channel, an unknown service type, and so on.

FIG. 24 illustrates a stereo 3D viewing condition information descriptor according to an exemplary embodiment of the present invention.

In case viewing conditions having high distribution levels are selected in advance, and in case the transmitting end generates (or creates) in advance contents best-fitting each viewing condition, in order to minimize resource, such as a Bandwidth that is required for transmitting all Stereo view pairs respective to each case, and so on, the transmitting end may fix and transmit only one image and may transmit the remaining images in real-time or non-real-time through a separate independent path.

In this case, the view pair descriptor( ) may be transmitted by being included in signaling section information of a channel to which additional view video is transmitted, and configuration information of a 3D view pair may be included in the view pair descriptor( ).

The stereo 3D viewing condition information descriptor may include a base_channel_number field, a base_program_number field, a base_source_id field, a base_network_id field, a base_PID field, and/or a num_of_view_pairs field.

In case only the additional view is transported through a current channel or other paths, the base_channel_number field indicates a channel number transmitting the related base view video.

In case only the additional view is transported through a current channel or other paths, the base_program_number field indicates a program number of the related base view video.

In case only the additional view is transported through a current channel or other paths, the base_source_id field corresponds to an identifier identifying a source of the related base view video.

In case only the additional view is transported through a current channel or other paths, the base_network_id field corresponds to an identifier identifying a network that provides the related base view video.

In case only the additional view is transported through a current channel or other paths, the base_PID field indicates a PID of a packet transmitting the related base view video.

The num_of_view_pairs field indicates a number of stereo 3D views that are being provided.

The description of the remaining fields will be replaced with the description of each field described above in FIG. 12.

Figure 25:
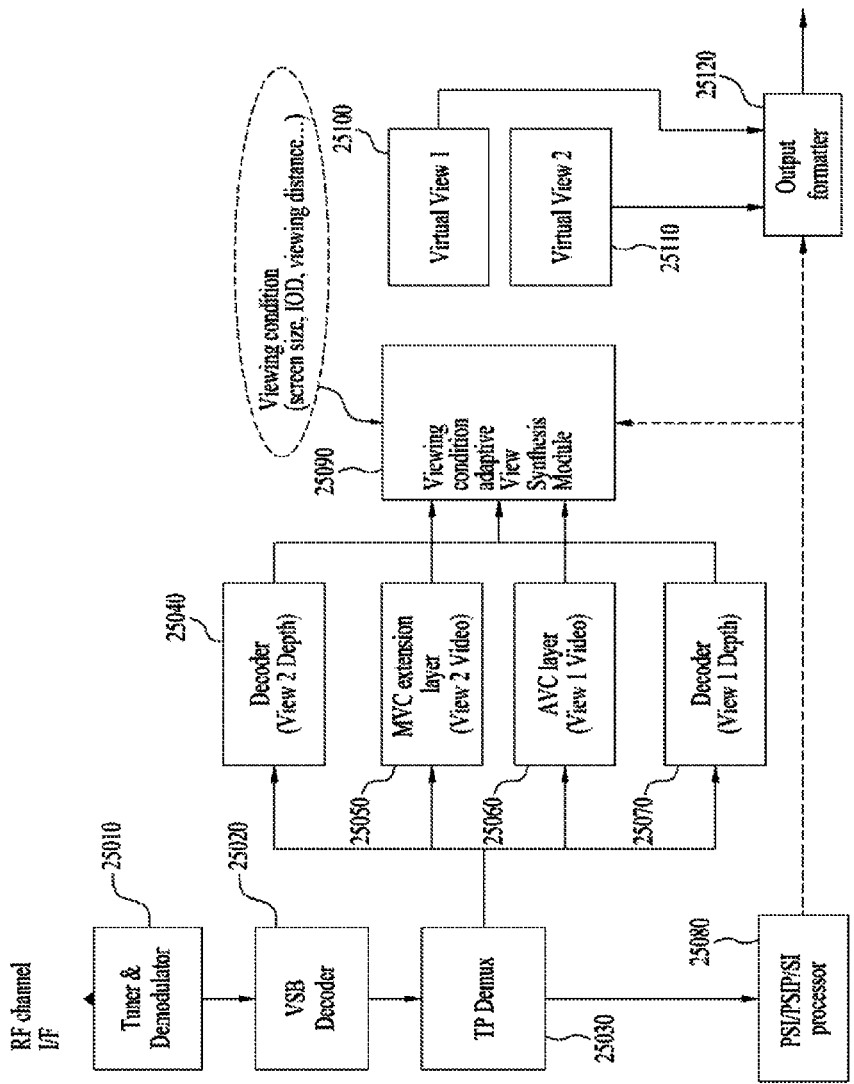
FIG. 25 illustrates a receiver providing a 3D image best-fitting a viewing condition according to an exemplary embodiment of the present invention.

FIG. 25 illustrates a receiver providing a 3D image best-fitting a viewing condition according to an exemplary embodiment of the present invention.

A receiver providing a 3D image adaptive to the viewing condition may include a tuner and demodulator (25010), a VSB decoder (25020), a transport packet demultipelxer (25030), a second decoder (25040), a MVC extension layer decoder (25050), an AVC layer decoder (25060) a first decoder (25070), a PSI/PSIP/SI processor (25080), a view synthesis module (25090), a first virtual view generator (25100), a second virtual view generator (25110), and/or an output formatter (25120).

The tuner and demodulator (25010) perform tuning to a 3D broadcast channel and demodulate a received signal.

The VSB decoder (25020) decodes a signal having VSB applied thereto. Although the name of this block is referred to as a VSB decoder, this block may also be viewed as a block decoding a signal having OFDM applied thereto.

The transport packet demultipelxer (25030) divides (or splits) a transport packet from the broadcast signal. Most particularly, this performs a function of filtering a packetidentifier.

The second decoder (25040) decodes depth information for a second image (or second view).

The MVC extension layer decoder (25050) decodes data for the second image.

The AVC layer decoder (25060) decodes data for a first image.

The first decoder (25070) decodes depth information for the first image.

The PSI/PSIP/SI processor (25080) performs processing of a signaling signal. For example, this performs a function of processing diverse tables being included in the PSIP or DVB SI, or a function of processing a signaling packet, a signaling segment, and so on. The PSI/PSIP/SI processor (25080) may perform a function of processing information included in the above-described descriptor, and so on.

The view synthesis module (25090) performs a function described in FIG. 1 or FIG. 2. The detailed description of the view synthesis module will be replaced with the description of FIG. 1 or FIG. 2.

The first virtual view generator (25100) renders a first virtual view (or image) based upon information or data analyzed (or synthesized) by the view synthesis module. For example, the first virtual view may correspond to a left image included in the 3D image.

The second virtual view generator (25110) renders a second virtual view (or image) based upon information or data analyzed (or synthesized) by the view synthesis module. For example, the second virtual view may correspond to a right image included in the 3D image.

The output formatter (25120) formats a 3D image by combining the first virtual view and the second virtual view.

FIG. 26 illustrates a method for processing a 3D broadcast signal according to an exemplary embodiment of the present invention.

The receiver receives a broadcast signal including 3D (3-dimensional) content (s26010).

The receiver parses target viewing condition information and one or more reference viewing condition information from the received broadcast signal (s26020). Herein, the target viewing condition information includes information indicating an optimal screen size for viewing 3D content, information indicating an optimal viewing distance for viewing 3D content, and information indicating an optimal IOD (Inter Ocular Distance) for viewing 3D content, and the reference viewing information includes a recommended screen size, a recommended viewing distance, a recommended IOD, and information indicating compensation type information indicating an element based upon which the recommended screen size, the recommended viewing distance, and the recommended IOD have been calculated.

The receiver receives viewing condition information of the viewer, and in case the received viewing condition information does not match with the target viewing condition, compensation type information, which is included in the reference viewing condition information including information that is most approximate to the received viewing condition information, is parsed, and the 3D content is rendered so that elements indicated by the compensation type information can be maintained (s26030).

The receiver performs control operation so that the rendered 3D content can be displayed (s26040).

Although the drawings have been distinguished and divided in order to facilitate the description of the present invention, the present invention may provide a design for configuring a new embodiment by combining some of the previously described embodiments of the present invention. Moreover, whenever required by anyone skilled in the art, the scope of the present invention includes designing a recording medium readable by a computer, the computer having a program for executing the above-described embodiments of the present invention recorded therein.

As described above, the device and method according to the present invention may not be limited only to the above-described configuration and methods according to the exemplary embodiments of the present invention, and, therefore, variations of the exemplary embodiments of the present invention may be configured by selectively combining each exemplary embodiment of the present invention fully or in part.

Meanwhile, the method for processing broadcast signals related to a broadcast program according to the present invention may be realized as a code that can be read by a processor, which is provided in a network device, in a recording medium that can be read by a processor. The recording medium that can be read by the processor includes all types of recording devices storing data that can be read by the processor. Examples of the recording media that can be read by a processor may include ROMs, RAMs, CD-ROMs, magnetic tapes, floppy disks, optical data storing devices, and so on. Also, an exemplary recording medium being realized in the form of a carrier wave, such as a transmission via Internet, may also be included. Also, the recording medium that can be read by a processor may be scattered within a computer system, which is connected through a network. And, a code that can be read by the processor may be stored and executed by using a dispersion (or scattering) method.

It will be apparent to those skilled in the art that various modifications and variations can be made in this specification without departing from the spirit or scope of this specification. Thus, it is intended that this specification covers the modifications and variations of this invention provided they come within the scope of the appended claims and their equivalents. It is also apparent that such variations of this specification are not to be understood individually or separately from the technical scope or spirit of this specification.

Also, a device invention and a method invention are both described in this specification. Therefore, whenever required, the description of both inventions may be supplementarily applied.

MODE FOR CARRYING OUT THE PRESENT INVENTION

As described above, the mode for carrying out the present invention is described as a best mode for carrying out the present invention.

INDUSTRIAL APPLICABILITY

The present invention may be used in a series of industrial fields related to the provision of 3DTV broadcast services.

What is claimed is:

1. An apparatus for processing 3-dimensional (3D) broadcast signals, the apparatus comprising:
   a tuner configured to receive broadcast signals containing 3D content;
   a service information processor configured to parse target viewing condition information and at least two reference viewing condition information received from the broadcast signals which are received,
   wherein the target viewing condition information includes information indicating an optimal screen size for viewing 3D content, information indicating an optimal viewing distance for viewing 3D content, and information indicating an optimal IOD (Inter Ocular Distance) for viewing 3D content,
   wherein respective reference viewing condition information includes information indicating a reference screen size, a reference viewing distance, a reference IOD, compensation-type information, and compensation parameter information,
   wherein the compensation-type information indicates an element among a vergence angle, a parallax angle, and a viewing distance,
   wherein the compensation parameter information includes parameters that are used for rendering the 3D content based upon the reference viewing condition information, and
   wherein the reference screen size, the reference viewing distance, the reference IOD, and the compensation parameter information have been derived under a condition that the element is fixed;
   a viewing analysis processor configured to:
   receive reception viewing condition information indicating a viewing environment of a receiving end,
   parse compensation-type information that is included in the reference viewing condition information, which contains information that is most relevant to the reception viewing condition information, and render the 3D content according to the one reference viewing condition information which contains information that is most relevant to the reception viewing condition information; and an output formatting processor configured to display the 3D content.

2. The apparatus of claim 1, wherein the service information processor parses the target viewing condition information and at least one reference viewing condition information from an SEI (Supplemental Enhancement Information) message, the SEI message being included in a video header of a video element for the 3D content.

3. The apparatus of claim 1, wherein the service information processor parses the target viewing condition information and at least one reference viewing condition information from a stereo 3D rendering information descriptor being included in a PMT (Program Map Table).

4. The apparatus of claim 1, wherein the service information processor parses the target viewing condition information and at least one reference viewing condition information from a stereo 3D rendering information descriptor being included in a VCT (Virtual Channel Table) or SDT (Service Description Table).

5. The apparatus of claim 1, wherein the reference viewing condition information further includes reference parameter validity information indicating whether or not the reference screen size, the reference viewing distance, or the reference IOD corresponds to valid information.

6. The apparatus of claim 5, wherein the service information processor further parses number information specifying a number of the at least one reference viewing condition information.

7. A method for processing 3D (3-dimensional) broadcast signal transmission, the method comprising:

generating 3D content;

generating target viewing condition information and at least two reference viewing condition information, wherein the target viewing condition information includes information indicating an optimal screen size for viewing 3D content, information indicating an optimal viewing distance for viewing 3D content, and information indicating an optimal IOD (Inter Ocular Distance) for viewing 3D content, wherein respective reference viewing condition information includes information indicating a reference screen size, a reference viewing distance, a reference IOD, compensation-type information, and compensation parameter information, wherein the compensation-type information indicates an element among vergence angle, a parallax angle and a viewing distance, wherein the compensation parameter information includes parameters that are used for rendering the 3D content based upon the reference viewing condition information, and wherein the reference screen size, the reference viewing distance, the reference IOD, and the compensation parameter information have been derived under a condition that the element is fixed;

generating a broadcast signal including the 3D content and the target viewing condition information and the at least two reference viewing condition information; and transmitting the generated broadcast signal.

8. The method of claim 7, wherein the generating a broadcast signal comprises:

inserting the target viewing condition information or one or more reference viewing condition information in an SEI (Supplementary Enhancement Information) message, the SEI message being included in a video header of a video element for the 3D content.

9. The method of claim 7, wherein the generating a broadcast signal comprises:

inserting the target viewing condition information or one or more reference viewing condition information in a PMT (Program Map Table) by including the information in a stereo 3D rendering information descriptor.

10. The method of claim 7, wherein the generating a broadcast signal comprises:

inserting the target viewing condition information or one or more reference viewing condition information in a VCT (Virtual Channel Table) or SDT (Service Description Table) by including the information in a stereo 3D rendering information descriptor.

11. The method of claim 7, wherein the reference viewing condition information further includes reference parameter validity information indicating whether or not the reference screen size, the reference viewing distance, or the reference IOD corresponds to valid information.

12. The method of claim 11, wherein the generating target viewing condition information and at least two reference viewing condition information comprises:

generating number information specifying a number of the at least one reference viewing condition information.

* * * * *